F. O. WOODLAND.
LABELING MACHINE.
APPLICATION FILED JULY 21, 1910.

1,027,959.

Patented May 28, 1912.
6 SHEETS—SHEET 1.

Fig. 1.

Witnesses.
Ella P. Blenus
Edw. King

Inventor.
Frank O. Woodland
By Chas. H. Burleigh
Attorney.

F. O. WOODLAND.
LABELING MACHINE.
APPLICATION FILED JULY 21, 1910.

1,027,959.

Patented May 28, 1912.

Witnesses.
Ella P. Blenus
Edw. King.

Inventor.
Frank O. Woodland
By Chas. H. Burleigh
Attorney

F. O. WOODLAND.
LABELING MACHINE.
APPLICATION FILED JULY 21, 1910.

1,027,959.

Patented May 28, 1912.
6 SHEETS—SHEET 6.

Witnesses—
Ella P. Blenus
Edw. King

Inventor.
Frank O. Woodland
By Chas. H. Burleigh
Attorney.

COLUMBIA PLANOGRAPH CO., WASHINGTON, D. C.

UNITED STATES PATENT OFFICE.

FRANK O. WOODLAND, OF WORCESTER, MASSACHUSETTS.

LABELING-MACHINE.

1,027,959.  Specification of Letters Patent.  Patented May 28, 1912.

Application filed July 21, 1910. Serial No. 573,001.

*To all whom it may concern:*

Be it known that I, FRANK O. WOODLAND, a citizen of the United States, residing at Worcester, in the county of Worcester and State of Massachusetts, have invented a new and useful Labeling-Machine, of which the following is a specification, reference being made therein to the accompanying drawings.

The object of this invention is to provide a comparatively simple and inexpensive labeling machine that will operate with practical efficiency, rapidity and convenience, in the affixment of labels upon bottles, or other articles of similar class; and my present invention consists in a novel construction and arrangement of certain parts of the mechanism, and in the combination and organization thereof for operation in the manner substantially as explained; the particular subject matter of invention claimed being hereinafter definitely specified.

In the accompanying drawings.

Referring to the drawings, the numeral 2 denotes the main frame of suitable form for supporting the working mechanisms.

3 indicates the operating-shaft mounted to turn in bearings fixed upon the frame. A drive-wheel or pulley P is arranged to turn loose upon the shaft, and an automatic stop-clutch C is combined therewith in well known manner for clutching the pulley to the shaft for effecting rotation of the latter as required. Said clutch is controlled by a treadle D and suitable connection *e* in usual manner. Depression of the treadle lets the clutch into action, and the shaft revolves with the pulley while the treadle is held depressed. When the treadle is released the clutch is automatically thrown off and the shaft stops at a predetermined position when it has completed a full revolution, as in usual practice.

4 indicates the supporting rest whereon the bottle B, or other article, is placed for receiving the label. Said rest is attached to a forwardly projecting part of the frame and remains stationary at its adjusted position when in use. The top of the rest may be formed to accommodate the special type of bottles or articles to be labeled, as in any instance desired.

The present invention comprises a vertically swinging wiper-mechanism; a vertically swinging picker-mechanism arranged for coacting with an overhead label-supply holder, and glue-delivering appliances of novel construction; and actuating means for moving or controlling the several mechanisms in their organized operation, substantially as will be now explained in detail.

In the wiper-mechanism the pair of laterally oscillating wiper arms or levers 5 are mounted upon a vertically swinging head or hinging frame 6 that is supported, at its rear end, upon a horizontal fulcrum axis or shaft 7, preferably disposed across the space between the upright rear members of the main frame; whereby said head, together with the wiper-arms, is adapted to swing up and down at the forward end; motion being imparted thereto from the operating shaft 3 by a crank 8 and a connecting-rod 9 as indicated, or by other suitable means. The head 6 is best provided with forwardly projecting arm 10 that carries the stud by which the connecting-rod is joined thereto.

The wiper-arms are provided at or near the fore-ends with facilities for the attachment thereto of the wipers 12; and their rear ends, which are tubular, are mounted upon the parallel forwardly projecting axis-studs or pins 13 fixed in the pivoting head 6.

A cross-bar plate 15 (see Figs. 5 and 6) is mounted upon the swinging-head 6; in the present instance by earhubs 14 that embrace the pins 13. Said plate is provided with a guide-way in which is arranged the slide 16 that controls the lateral swing or oscillation of the wiper arms; each of said wiper-arms being provided with an offset ear that is pivotally coupled to a stud carried upon the slide by a short link 17. The cross-plate 15 and slide 16, which is guided thereon, both swing up and down with the movement of the head 6, but the slide 16 also has a differential or endwise movement in addition to the movement of its guide. It is connected by a rod 18 to a swinging lever 19 that is fulcrumed at 21, and provided with a roll 22 that runs upon the face of a cam 20 carried by the operating-shaft, whereby the slide 16 is moved as desired, the face of the cam 20 being shaped with a contour that will impart the proper movement for closing the wiper-arms 5 at the required intervals of time. The opening of the wiper may be effected by a spring of any suitable character arranged to force the lever 18 and roll 22 toward the face of the cam 20, and of sufficient power to reactively move the connected parts in opposition to the cam action as the cam surface recedes.

Figure 4:
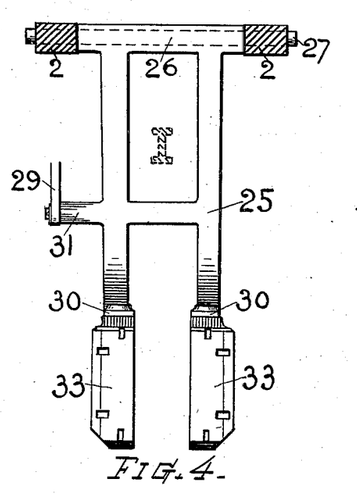
Fig. 4 is a separate plan view of the picker-carrier and pickers.

The picker-carrier 25 consists of a suitably shaped frame or arm having a broad rear-end hub or bearing 26 that is hinged upon a fulcrum bar or shaft 27 between the upright rear members of the main frame, so that the front end of the carrier frame can swing up and down for carrying the pickers from the rest to the label-holder and vice versa, motion being imparted thereto from the operating shaft by a crank 28 and connecting rod 29, or by other efficient means. The picker-carrier 25 is preferably formed as an integral frame composed of a pair of rigidly united longitudinal members joined together by the fulcrum hub and a suitable cross-bar, (see Fig. 4) and having a laterally projecting arm or member 31 to which the connecting-rod 29 is pivotally attached. The longitudinal members at their fore end extend forward with upwardly curved or offset projecting ends 30 respectively terminating with suitable picker-supporting seats, to which the glue-applying picker-plates 33 (of any desired shape) are detachably secured, with the faces of said picker-plates preferably in a plane coincident with each other and in radial alinement with the horizontal axis on which the picker-carrier is fulcrumed. The pickers move in a circular arc from a position just above the bottle rest up to the bottom of the label-holder, and return; by the swinging of the carrier on the axis 27, which latter keeps the carrier in proper relation without other guiding means. The cranks 8 and 28, for moving the wiper mechanism and picker mechanism, are preferably made as a dual or compound crank with the wrist-pins disposed for giving differential and opposite movements to the said mechanisms as required.

Figure 3:
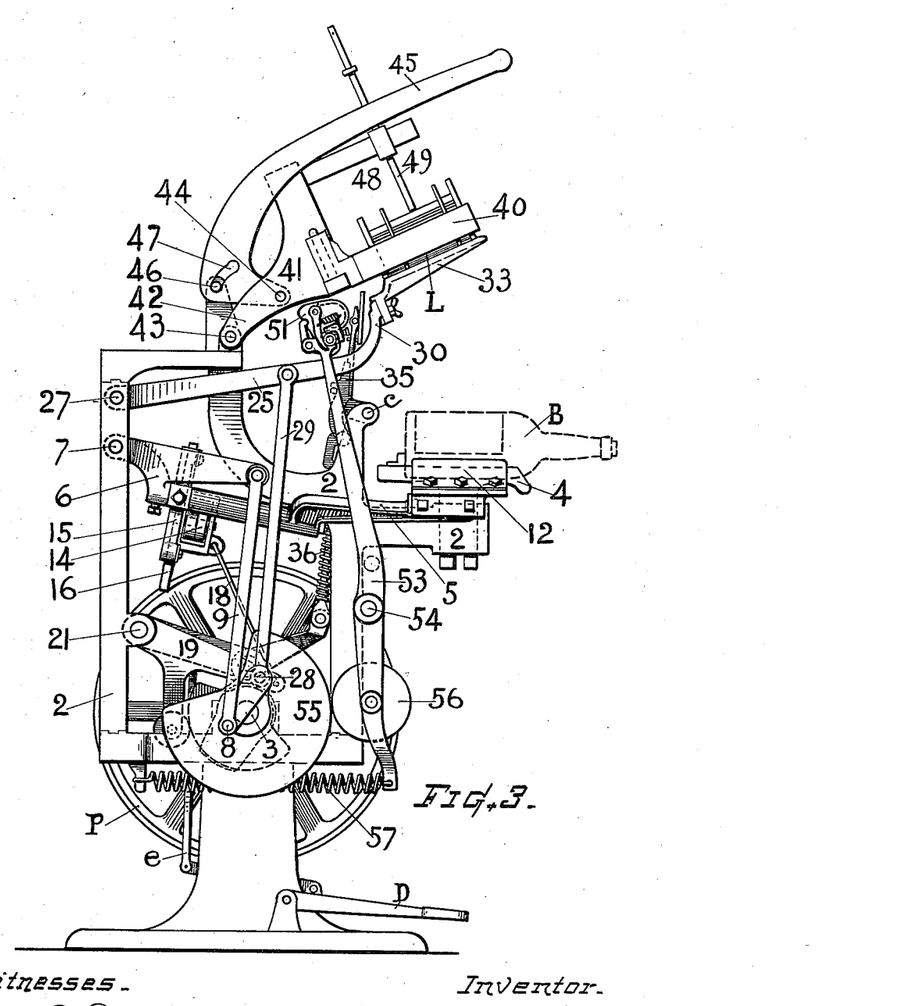
Fig. 3 is a left side elevation view.

Numeral 35 indicates the grip-device for temporarily holding the label against the bottle or package while said label is being released from the pickers, and during the wiping-on action. It comprises a finger lever, a presser member and a pivoting head preferably as shown. Said grip-device is fulcrumed at $c$ upon a central upwardly projecting portion of the frame, by a horizontal axis-stud, as best shown in Fig. 3; and is operated through the medium of the connecting rod 36 and lever 37 from a suitably shaped cam 38 mounted upon the operating shaft 3, or by other efficient actuating means. The connecting-rod 36 is preferably formed with an endwise yielding section, and provided with an expanding spring that keeps the rod extended with due strength, but relieves the grip from excess of pressure in its action.

Figure 2:
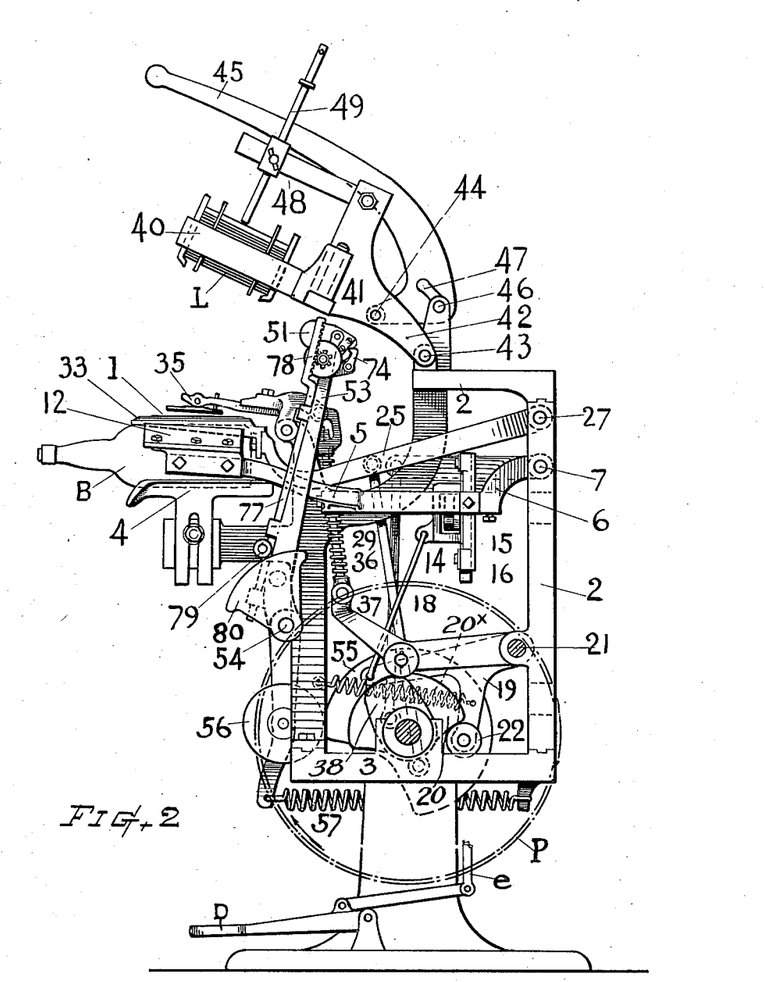
Fig. 2 is a right side elevation view of the same; the pulley and clutch being omitted.

For supporting the label-box or label-holder 40 in this machine, there is provided a hinging frame or carrier 41 that is connected to the upper part, or top-plate, of the main frame by horizontally disposed hinge devices or joint pins 43, that respectively pass through and connect the rearwardly extended arms 42, formed on the carrier, to suitable ears or lugs formed on the frame, as best shown in Figs. 2 and 3; so that the carrier and label-holder can swing upward and backward, or vice versa. The hinging axis 43 is approximately parallel with the hinging axis 27 of the picker-carrier frame. The body portion of the carrier 41 is provided with a suitable ledge and projecting studs upon which the label-holder 40 is detachably sustained in an oblique position above the pickers; so that the bottom face of the pack of labels L thereon will correspond with the inclination assumed by the faces of the pickers 33, when the latter are elevated by the upward swing of the picker-carrier; the delivering of the labels to the pickers being accomplished at this oblique position, which is in a plane approximately radial to the hinging axis 27 of the picker-carrier. The hinged label-holder carrier has a transverse rod or pivot 44, whereby it is connected with one arm of the hand-operated lever 45, the heel of which is fulcrumed on a stationary axis-stud 46 by an inclined slot 47, in such manner that raising or depressing the hand operated lever 45 will swing the label-holder carrier 41 on its hinging pivots 43, up or down in a limited degree, thereby shifting the label-holder from or into engaging relation with the pickers for stopping or starting the feed of labels. The slot 47 is best made of such form that the adjustments are self retained at either elevated or depressed position.

The removable label-holder, box, or receptacle 40, may in itself embody any approved construction, since the special structural details thereof are not features of the present invention. Said label-holder is preferably of the top-charging, open-bottomed type, composed of a supporting frame and guide-stakes having means for supporting a pack of labels and facilitating the delivery of labels singly therefrom. The follower device, or means for retaining the pile of labels compact upon the label-holder, may be of any suitable construction. As herein shown, it consists of a projecting support-bar 48, an automatically adjusting follower rod 49, and means for resisting movement of the rod by upward pressure against the pack of labels.

Figure 12:
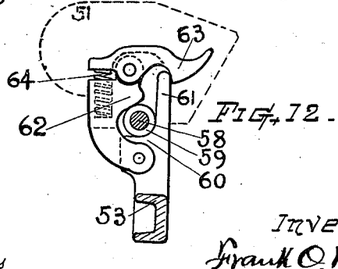
Fig. 12 is a side view of one of the latch devices for detachably securing the glue-delivering mechanism to the swinging supporting arms.

The means for distributing paste, gum or glue upon the faces of the pickers 33 consists of a gluing roller 50, and a tiltable glue-box or reservoir 51, both mounted upon the moving end of a pair of upright backwardly and forwardly swinging supporting arms or levers 53, that are fulcrumed at 54 on the supporting frame 2 and actuated to carry the glue-box and roller across the picker faces, by cam 55 mounted on the operating-shaft 3 and engaging a stud-roll 56 connected with the swinging arm, and a reacting spring 57 that moves the parts in opposition to the cam. The roller axle 58 is extended at the ends of the roller, and provided with tubular sleeves or cylindrical bushing tubes 59 thereon, within which the roller-axle can turn freely as a bearing. The arms 53 are each provided with a shoulder or seat 60, and an upward projection 61 at the back-side thereof. (See Fig. 12.) The roller is supported upon the arm by resting its bushing upon the seat shoulder against the back projection, where it is detachably confined by a holding-dog or device 62, pivoted to the arm, and having an incline or lug that presses upon the bushing, and a pivoted spring-pressed catch 63 at its upper end which latches over the end of the projection 61. A spring 64 is arranged in a socket in the holding device 62 and presses upward against the tail of the catch-piece for normally keeping it in latched condition.

The reservoir or glue-box 51 is preferably formed as a forwardly protuberant U-shaped pocket (see section, Fig. 9) having an inclined back wall and upright ends. The box corresponds with the length of the roller 50, one side of which occupies a space or opening in the lower part of the box, in the manner illustrated. The top edge of the glue-box extends rearward over the interior, as at 65, leaving an open space 66 for charging; while its under part extends rearward forming a lip, or flat shelf 67 that lies tangentially over and adjacent to the top surface of the roller, making a comparatively close junction, but with a certain amount of clearance, approximately equal to, or slightly more than the thickness of the film of glue that is carried on the surface of the roller. The lower edge of the inclined back wall is offset toward the face of the roller to form a gage lip 68 which gages the thickness of the film of glue or other adhesive substance taken out by the roller. The special features of a glue-box mechanism of this class are made the subject of a separate application for Letters Patent.

Figure 5:
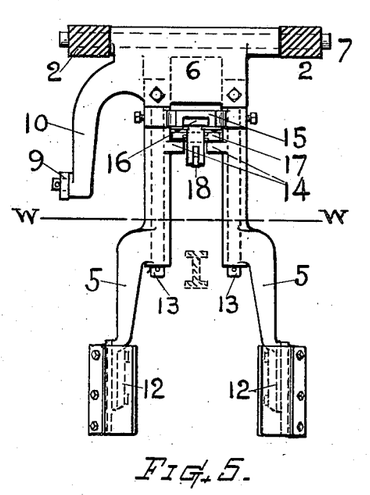
Fig. 5 is a separate plan view of the wiper mechanism.
Figure 6:
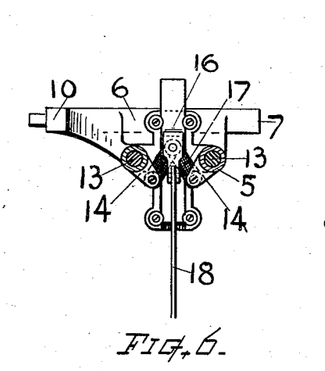
Fig. 6 is a section at line W W on Fig. 5, showing the front view of the wiper-controlling slide.
Figure 7:
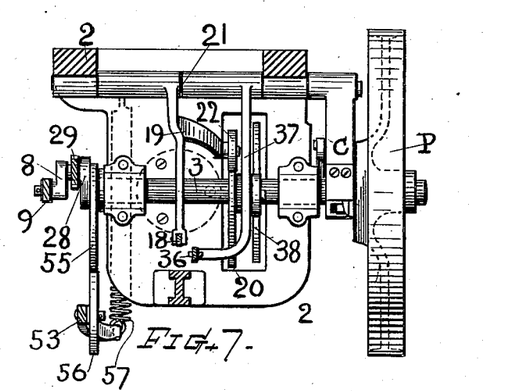
Fig. 7 represents a horizontal sectional view showing the plan of the operating shaft and cam devices.
Figure 10:
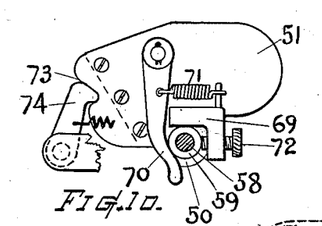
Figs. 10 and 11 are separate detail views showing the respective ends of the glue-box.
Figure 11:
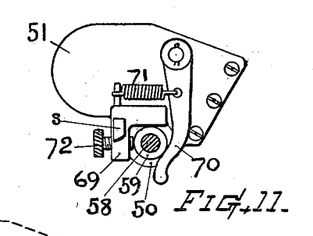

The ends of the glue-box are each provided with a rigidly attached angular bearing member 69, and a pivotally attached spring pressed finger 70, the end of which depends opposite said bearing-member, and is normally pressed toward the same by a suitable spring 71. The glue-box is mounted upon the roller and retained by the embrace of the bushing or bearing sleeve between the angular bearing-member 69 and spring-pressed finger 70, as best shown in Figs. 5, 10 and 11. A thumb-screw 72 is arranged in the front part of the angular bearing-member, which screws against the sleeve and serves for adjusting the parts to vary the width of space between the roller 50 and gage lip 68, and thus regulate the thickness of the film of glue carried to the pickers. This adjustment is effected in a direction approximately parallel with the under or seating surface of the bearing-member 69, so that adjustment of the gage can be effected at any time without consideration of the clearance space between the overlying wall or shelf 67 and top of the roller; which space is controlled by the seating surfaces of the bearing members 69 upon the axle bearing sleeve.

Figures 13, 14, 15, 16:
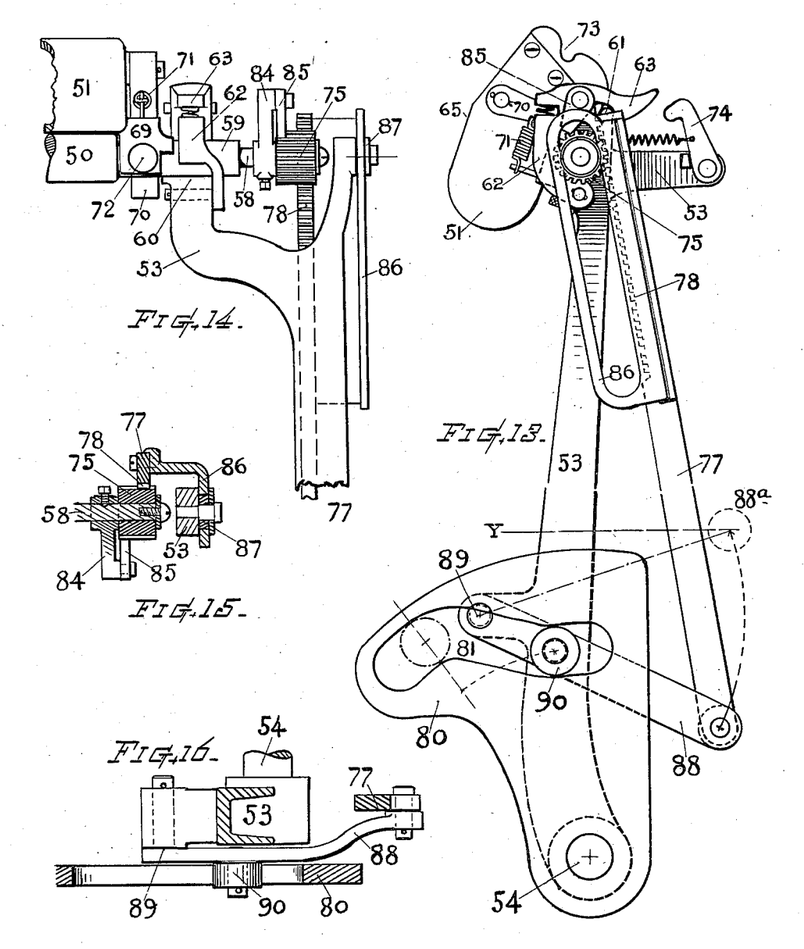
Fig. 13 represents a detail side view of the glue-delivering mechanism, showing a modification in the means for rotating the gluing roller.
Fig. 14 is a front view of a portion of the same.
Fig. 15 is a fragmentary horizontal section at the center line of the glue-roller axle.
Fig. 16 is a horizontal section at line Y on Fig. 13, showing the actuator lever and cam.

A suitably arranged notched member 73 and spring pressed catch-device 74 are provided for retaining the glue-box at normal upright or working position. By releasing the catch 74 the glue-box can be swung down, as illustrated in Fig. 13, so that the glue will settle into the U-shaped end of the pocket away from the roller, thereby avoiding the leakage of glue through the delivery space when the machine is idle. One of the bearing-members 69 is provided with a stop-lug *s* that rests against the arm 53 when the box is swung down to idle position.

The glue-box can be readily separated from the gluing roller 50 by releasing or pressing back the fingers 70, and as readily reassembled. The roller, or roller and glue-box together, can be readily separated from the carrier-arms 53 by throwing off the latches 63 and swinging forward the holding dogs 62; and reassembled by reversing such operation.

For rotating the gluing roller 50 there is provided upon the roller-axle 58 a gear pinion 75, turning loose on the axle, and a ratchet device 76 that is keyed or fixed on the axle; and combined therewith is a reciprocating bar or rod 77 carrying a toothed rack 78 that engages with the pinion. The bar is provided with means for its actuation by a fixed cam 80, whereby endwise movement is imparted to said rack as the glue-box carrying arms 53 swing forward and back; thereby rotating the glue-roller as required for bringing fresh glue into contact with the picker faces as the roller passes over them.

Figure 1:
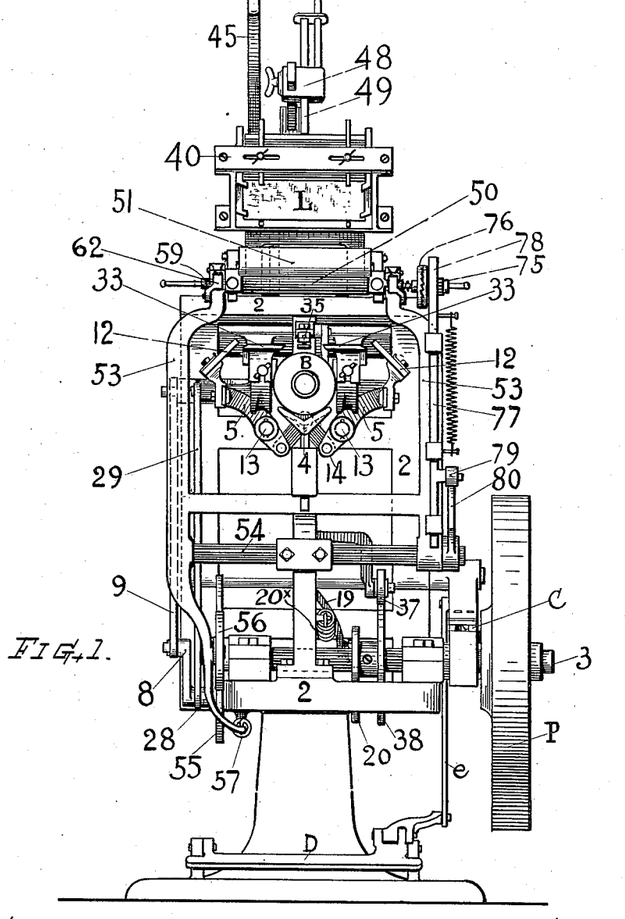
Figure 1 represents a front view of my improved labeling machine.
Figures 8, 9, 17:
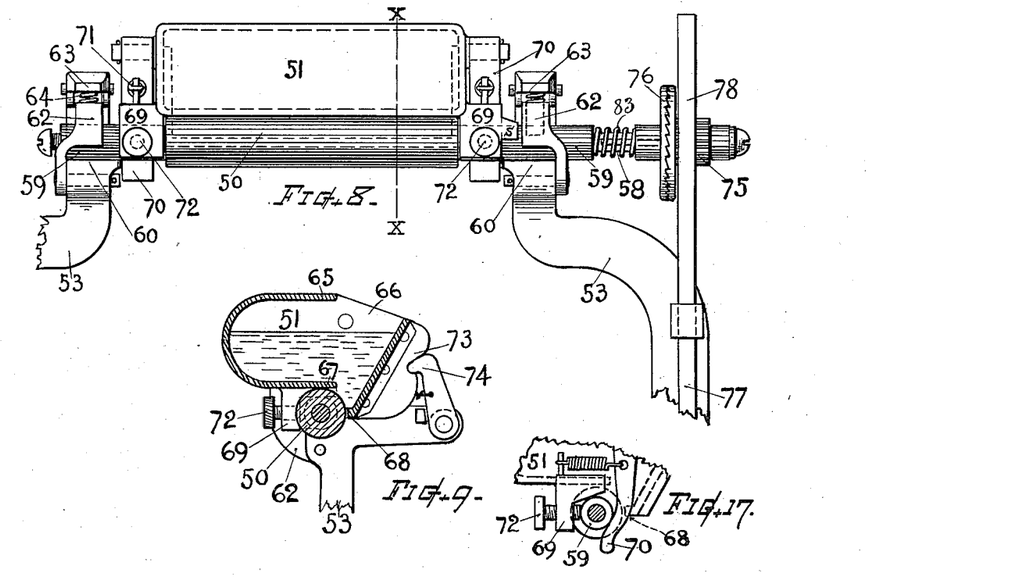
Fig. 8 represents a separate detail front view of the glue-delivering mechanism.
Fig. 9 is a cross section of the glue-box and roller at line X X on Fig. 8.
Fig. 17 is a fragmentary view showing the box-supporting bearing member as made with an inclined under face.

As shown in Figs. 1, 2 and 8, the bar 77 carrying the rack, is made to slide in guides on the swinging arm 53, and is provided with a roller stud 79 that runs on the edge of the cam 80, while the ratchet device is made of disk-form, in two parts, having adjacent notched faces, (see Fig. 8) one part being attached to the pinion, and the other pressed toward the first by a coiled spring 83 arranged about the axle, so that the ratchet teeth engage when the pinion moves in one direction, and release with movement in the other direction.

In Figs. 13 to 16 there is shown a modification of the means for rotating the glue-roller. In this latter instance the pinion 75 is loose on the roller-axle or shaft 58, and the ratchet device consists of an arm 84 keyed upon the shaft and carrying a pawl 85 that catches in the gear teeth in one direction and releases in the other direction of movement. The rack 78 and bar 77 are guided by a slotted member 86 that embraces a hub 87 mounted on the roller-axle, while the lower end of the bar is connected to one end of a swinging lever 88, the other end of which is pivoted at 89 to the swinging arm 53 that carries the glue-box and roller 50. A roll or stud 90 mounted upon the side of the lever runs in the cam-slot 81, as indicated on Fig. 13, for moving the lever 88 and rack 78 as the glue-box carrying arm swings forward and back. As the roll 90 travels forward in the cam slot 81, the end of the lever and rod swing to the relative position 88ª, indicated by dotted lines on Fig. 13. The actuating means shown in Fig. 13 is adapted to give a somewhat greater degree of rotation to the gluing roller than that shown in Figs. 2 and 8.

Fig. 17 illustrates a modification wherein the under surface of the box-bearing member 69 is formed on an incline instead of horizontal. With this form when the screws 72 are turned in or out for regulating the delivering space between the scraper edge and roller face there is also effected a corresponding regulation of the clearance space between the wall or shelf 67 and top of the roller.

In the operation, the bottle B is placed upon the rest; the pickers 33 swing up to the oblique position of the label-holder 40, receiving, as they ascend, a charge of gum or glue upon their faces from the swinging glue-box and roller 50. Said pickers take the label singly from the pack and swing down to a position near the top of the bottle. The grip-device swings down upon the center of the presented label, and the pickers are then released therefrom. The wiper mechanism is elevated by the swinging action of its pivoted head, so as to bring the wipers above the bottle and label. The wiper-carrier arms are next closed in by the action of the controlling means, and the wiper-mechanism then swings downward for wiping the label upon the bottle. The wipers are then opened and the mechanism assumes its primal position ready for repeating the operation, and stops by the automatic release of the clutch C as the operating shaft completes its revolution.

I claim and desire to secure—

1. In a labeling machine, a package-supporting rest, an obliquely disposed label-supply holder overhanging said rest, an upwardly and downwardly swinging picker-carrier having its rear end fulcrumed upon the main frame by a horizontal hinging axle, and carrying the pickers at its front end; means for swinging said picker-carrier to carry the pickers to and from the label-holder, an upwardly and downwardly swinging wiper mechanism, comprising a supporting head mounted at its rear end upon a horizontal fulcrum axis in connection with the frame, a pair of laterally oscillating wiper-carrier arms and wipers thereon, means for swinging said wiper mechanism up and down to carry the wipers past the package and rest, and means for controlling the oscillative action of said wiper-carrier arms, substantially as set forth.

2. In a labeling machine, the combination, of a stationary supporting rest, an upwardly and downwardly swinging picker mechanism, an upwardly and downwardly swinging wiper mechanism, each of said mechanisms mounted at its rear end upon a horizontal fulcrum axis, means for imparting up and down swinging movement to said picker mechanism and said wiper mechanism, means for delivering glue to the picker mechanism, an overhead bottom-delivering label-holder, a carrier for said label-holder connected to its supporting frame by horizontal hinge pivots, and means for retaining said label-holder carrier at normal position, and for swinging it to a limited degree upon its hinge pivots.

3. In a labeling machine, the combination substantially as described, of a stationary rest, a grip-device, a label-holder for supporting a pack of labels projecting over said rest, a horizontally fulcrumed swinging picker-carrier, glue-applying pickers attached to the fore end of said carrier, a swinging wiper mechanism comprising a horizontally fulcrumed supporting head, oscillatable wiper-carrying arms, wipers carried thereon, and wiper-controlling means, said picker-carrier and said wiper mechanism being connected with the supporting frame, at their rear ends, by a transverse axis member, a backwardly and forwardly swinging glue-supply reservoir, an operating shaft and means carried by said shaft for severally actuating said picker-carrier, wiper mechanism, glue-supply and grip-device with differential swinging movements.

4. In a labeling machine, in combination substantially as described, a bottom delivering label-holder, a picker-carrier mounted at its rear end upon a hinging axis, and carrying the glue-applying pickers at its front end; means for swinging said picker-carrier up and down, a label-holder-carrier provided with rearwardly extended members hingedly connected with the supporting frame by a horizontal pivot-axis, and an adjusting means for retaining said label-holder-carrier at upper and lower predetermined positions.

5. In a labeling machine of the class specified, a wiper mechanism comprising a swinging transversely fulcrumed wiper-supporting head having two forwardly projecting axis members, a pair of laterally oscillatable wiper-carrying arms respectively mounted on said axis-members, a guide-plate carried upon and swinging with said wiper-supporting head, a wiper-controlling slide mounted in said guide-plate, pivotally connected links joining the wiper-arms with said slide, the operating shaft, means connected therewith for swinging said wiper-supporting head and wiper-carrying arms up and down, and means for imparting an independent movement to said controlling-slide, substantially as set forth.

6. In a labeling machine, in combination with means for supporting the article to be labeled, and an overhanging bottom-delivery label-holder; a swinging picker-carrier-arm having its rear end supported upon a horizontal axis in connection with the frame, the glue-applying picker-plates attached to and projecting from the front end portions of said carrier, to swing to and from said label-holder; a swinging wiper-mechanism, its head supported upon a horizontal axis in connection with the frame, adjacent to the picker-carrier axis, laterally oscillatable wiper-carrying arms axially mounted on said head, an operating shaft provided with a dual or compound crank, one wrist of said crank connected for swinging said picker-carrier, its other wrist connected for swinging said wiper mechanism, and means for controlling the lateral oscillation of the wiper-carrier arms.

7. In a labeling machine, in combination, an overhead label-holder, an under supporting rest and wiper means, a backwardly and forwardly moving glue-supply reservoir adapted to assume a retracted position at the rear of the elevated pickers, and to move to the forward ends of the pickers, a swinging picker-carrier consisting of a rigid body structure including longitudinal side members, a transversely disposed fulcrum-axis-bearing at the rear portion thereof, an intermediate connecting member, and a pair of forwardly projecting fore-end members provided with attaching seats for picker-plates, said fore-end members being upwardly curved or offset above the normal plane of the body frame, and the picker-plates supported on said seats and projecting forward from said fore-end members, with their faces, when elevated, parallel with the plane of the label pack, while the plane of said body-structure is below said glue-supply reservoir.

8. In a labeling machine, in combination with an overhead label-supply holder, and vertically swinging glue-applying pickers, means for supplying glue to said pickers, comprising a glue-distributing roller, a bottom delivering glue reservoir supported axially coincident with the roller axle and having an opening in which the surface of the roller runs, a swinging support for said roller and reservoir, and means for actuating said swinging support to carry the reservoir and roller over the faces of the pickers.

9. The combination with the work-supporting rest, overhead bottom-delivering label-holder, glue-applying pickers that move to and from the label-holder for adhesively taking labels therefrom, and means for affixing the labels upon the bottle or article placed upon said rest; of a tiltable glue-containing reservoir, and a glue distributing roller rotatable within an opening in the bottom of said glue-containing reservoir, a backwardly and forwardly swinging carrier upon which said reservoir and roller are axially mounted to pass back and forth over the pickers and beneath the label-holder, and means for retaining said tiltable reservoir in upright or working relation and releasing the same to permit of the reservoir being tilted downward when the machine is idle, substantially as set forth.

10. In a labeling machine, in combination with the label-supply holder and pickers that adhesively take labels singly therefrom, of a glue-supply mechanism comprising a tiltable glue-box, a gluing-roller fitting an opening in said glue-box, an axle and axle-bushings for said roller, means for detachably confining the glue-box in connection with the roller-axle-bushings, a catch device for holding the glue-box in upright relation, a pair of swinging arms having seats for supporting the roller-axle-bushings, holding dogs that retain the same upon the seats, and devices for securing and releasing said dogs.

11. In a labeling machine, the combination with a top-chargeable, forwardly upwardly inclined bottom-delivering label-holder, and label-affixing and label-grip appliances that act beneath said label-holder; of an upwardly and downwardly swinging picker-carrier having its fulcrum axis in a plane rearward of said label-holder, picker-plates obliquely positioned upon the fore-end of the carrier for adhesively taking labels from the bottom of the holder, a swinging glue-delivering carrier pivoted in horizontal relation, a distributing roller supported upon said carrier to swing across the picker surfaces by the compound movement of the up and down swing of the picker carrier and the fore and aft swing of the glue delivering carrier, and actuating means for the respective carriers correlatively adapted to carry the glue-distributing roller and obliquely positioned picker-plates into moving contact as the pickers ascend toward the label-holder, and out of contact or interference when performing their descending or return movements.

12. A labeling machine including, in combination substantially as described, a work supporting rest, a top-charged open-bottomed label holder having means for supporting a pack of labels for bottom delivery therefrom, a picker-carrier having glue-applying pickers carried thereon, movable to and from said label-holder, for taking labels singly from the pack and presenting the same adjacent to an article placed upon said rest, and wiper means for affixing the label; a backwardly and forwardly movable glue-box-carrier, a bottom-delivering pocket-formed glue-supply-box mounted upon said carrier to pass between the label-holder and pickers, and a bottom-delivery glue-distributing roller rotatably fitting therein, said glue-box provided with an exit gage-lip, and having an axial support upon its carrier in coincident alinement with the roller-axis, sets of releasable connection-device for connecting the roller and glue-box at the respective ends thereof, means for retaining the roller and glue-box in working position on the carrier, actuating means for controlling the movement of the respective carriers, and means for intermittently turning said glue-distributing roller.

13. In a machine of the class described, in combination with the swinging picker-carrier and pickers attached thereto, the backwardly and forwardly swinging supporting arms, the glue-box and glue-spreading roller mounted upon said arms, said roller having an extended axle; of a pinion and ratchet-device mounted on the roller-axle, a reciprocating bar carried upon one of said supporting arms and having a rack that engages said pinion, a stationary cam and cam-engaging means that effects reciprocating action of said bar and rack, as the glue-box and roller are moved back and forth.

14. In a labeling machine, the combination of a work-supporting rest, an obliquely-disposed top-charged bottom-delivering label holder, forwardly and upwardly projecting above said rest, an upwardly and downwardly swinging picker-carrier having forwardly projecting picker-plates thereon that elevate to the oblique position of said label holder, means for applying glue to said pickers, a wiper-carrier and differentially moving wiper-controlling means, the wiper arms rockably supported on said wiper-carrier and connected by links with said controlling means, the operating shaft and connections from said shaft for independently and differentially actuating said parts to effect a swing of the picker to and from said label-holder, the elevation and depression of the wiper-arms and the lateral rocking of said wiper-arms.

15. In a labeling machine, in combination with a positioning rest for the bottle or article to be labeled, and means for wiping the labels thereon; an overhead top-charged bottom-delivering label-holder disposed in a forwardly-projecting upwardly-inclined oblique position and adapted for maintaining and presenting the supply of labels in an oblique overhanging relation above said rest; an upwardly and downwardly swinging picker-carrier carrying the glue-applying picker members thereon, said picker-carrier pivoted at a position rearward of and below said label-holder, and means for imparting an up and down swinging action to said picker-carrier.

Witness my hand this 20th day of July 1910.

FRANK O. WOODLAND.

Witnesses:
A. G. DAVIS,
CHAS. H. BURLEIGH.

Copies of this patent may be obtained for five cents each, by addressing the "Commissioner of Patents, Washington, D. C."